US006499546B1

(12) United States Patent
Freeman et al.

(10) Patent No.: US 6,499,546 B1
(45) Date of Patent: Dec. 31, 2002

(54) BUFFERED WELL FLUIDS

(75) Inventors: Michael A. Freeman, Kingwood, TX (US); Taylor Caldwell Green, III, Houston, TX (US)

(73) Assignee: M-I, L.L.C., Houston, TX (US)

( * ) Notice: Subject to any disclaimer, the term of this patent is extended or adjusted under 35 U.S.C. 154(b) by 0 days.

(21) Appl. No.: 09/910,424

(22) Filed: Jul. 20, 2001

(51) Int. Cl.$^7$ .............................. E21B 37/08; C09K 7/06
(52) U.S. Cl. .......................................... 175/66; 507/110
(58) Field of Search .............................. 175/64, 65, 66, 175/70; 507/110, 127, 129

(56) References Cited

U.S. PATENT DOCUMENTS 4,575,428 A * 3/1986 Clapper et al. ........... 252/8.5 P
5,085,282 A * 2/1992 Hale et al. ..................... 175/40
5,254,531 A * 10/1993 Mueller et al. ............. 507/131
5,888,944 A * 3/1999 Patel ........................... 507/110

* cited by examiner

*Primary Examiner*—Frank S. Tsay
(74) *Attorney, Agent, or Firm*—Rosenthal & Osha L.L.P.

(57) ABSTRACT

The present invention relates to the use of a buffered acid wash to reduce the amount of oil in cuttings associated with the use of an invert emulsion well fluid. The buffered acid wash is sufficiently acidic as to convert all of the surfactant in the invert oil emulsion from one charge species into another, but substantially prevents the fluid from becoming so acidic as to generate carbon dioxide.

6 Claims, No Drawings

BUFFERED WELL FLUIDS

BACKGROUND OF INVENTION

1. Field of the Invention

The invention relates generally to the exploitation of hydrocarbon-containing formations. More specifically, the invention relates to clean up of non-aqueous based well fluids.

2. Background Art

When drilling or completing wells in earth formations, various fluids typically are used in the well for a variety of reasons For purposes of description of the background of the invention and of the invention itself, such fluids will be referred to as "well fluids." Common uses for well fluids include: lubrication and cooling of drill bit cutting surfaces while drilling generally or drilling-in (i.e., drilling in a targeted petroleum bearing formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, implacing a packer fluid, abandoning the well or preparing the well for abandonment, and otherwise treating the well or the formation.

As suggested above, a variety of potential well fluids are available for use, depending on the particular application. One significant class of well fluids is so called "oil-based" well fluids. Depending on the application, various hydrocarbons or other non-aqueous fluids may be used as a major component of the well fluid. For example, diesel fuel is commonly used as a principal component of certain well fluids. However, if the environment in the vicinity of the wellbore is particularly sensitive, or is subject to regulations on the use of diesel fuel as a well fluid component, solvent grade minerals oils and organic liquids including esters, paraffins, acetals, glycols, and olefins may be used. When these fluids are manufactured from lower molecular weight components, they may be referred to as synthetic, and their well fluids referred to as "synthetic-based." Both diesel and these latter fluids are included in the term "non-aqueous."

Throughout the specification, the phrase "oil-in-water" is used interchangeably with "non-aqueous." The phrase "oil-in-water" is intended to encompass all non-aqueous-in-water systems, and the term oil is used instead of non-aqueous for convenience only, and is not intended to limit the scope of the invention in any fashion. In most non-aqueous fluids, a separate aqueous phase is emulsified into the non-aqueous fluid to provide selected properties desirable for drilling. Generally the aqueous phase is a brine. Because emulsification of oil into water was developed first, these water-in-oil emulsions are often referred to as "invert emulsions." Typically, if a non-aqueous fluid is used in conjunction with brine, a phase separation between the oil and brine occurs. To secure a stable emulsion, a surfactant capable of emulsifying water into the hydrocarbon is an essential component of non-aqueous well fluids. One particular class of non-aqueous fluids are those which are "reversible" (i.e., the emulsion can be converted from a water-in-oil to an oil-in-water emulsion) by the action of a chemical or physical trigger such as pH, oxidizers, heat, light, microwaves, etc.

Non-aqueous fluids are often chosen for use in drilling fluids because of their excellent lubrication properties, their chemical stability, and their minimal chemical impact on certain earth formations that are sensitive to water-based well fluids. These properties permit the drilling of wells having a significant deviation of the well bore trajectory from vertical, as is typical of offshore or deep water drilling operations where highly inclined or even horizontal wells may be drilled. For example, in highly inclined wells, torque and drag on a drilling tool assembly used to drill the well (the "drillstring") are significant because the drillstring typically lies against the bottom of the well (the "low side of the hole"), and the risk of the drillstring becoming stuck in the well is high. Use of non-aqueous fluids has been shown to significantly reduce drill string sticking and similar problems encountered during directional drilling.

However, there are some disadvantages of using non-aqueous well fluids. Most notably, the disposal of formation cuttings removed from a well drilled with non-aqueous well fluids is a primary concern, especially for offshore or deepwater drilling operations or particularly remote and sensitive land-based operations. In many cases, environmental regulations require use of expensive synthetic fluids and the cuttings must meet stringent requirements for chemical content before they can be discharged into the environment.

To meet environmental discharge requirements, the cuttings generally must either be washed clean of the oil before disposal at sea or be injected as a slurry into an earth formation or be disposed on land in an environmentally safe manner.

U.S. Pat. No. 6,218,342 (the '342 patent), issued to Patel, and assigned to the assignee of the present invention, describes a class of suitable surfactants for use in "reversible" invert emulsion fluids. In particular, the '342 patent describes the use of an amine surfactant, which, upon protonation, causes the invert emulsion to "flip" and become a regular emulsion. In order to function, the amine surfactant described in the '342 patent requires that a protonating agent (an acid, for example) be added to the invert emulsion. After a sufficient amount of protonating agent, cited in the patent as mineral and organic acids or systems that generate such acids, is added, the amine surfactant becomes protonated and the emulsion flips from an invert emulsion to a regular emulsion.

The '342 patent also describes a purification method which includes separating oil-laden cuttings using conventional solids removal methods (such as sift-screening). The oil-laden cuttings are then contacted at least once with an acid solution, again defined as mineral and organic acids, so as to invert the emulsion coating the cuttings. Washing with acid causes the cuttings to convert from being "oil-wet" to being "water-wet" solids, allowing the substantial removal of the oil from the cuttings. In order to cause the "flip" from invert to regular emulsion, the pH of the system is typically lowered to about 2.

A significant, and problematic, side reaction occurs at this low pH. Generally speaking, when well fluids having a pH of greater than about 5.5 (which is typical) are passed through the air, they absorb carbon dioxide. When lime is present in the cuttings (which is often the case in cuttings drawn from the wellbore), the carbon dioxide and lime react to form calcium carbonate. When the pH is lowered below about 5.5, the absorbed carbon dioxide is evolved, resulting in the formation of gas bubbles at the point of acid contact. These gas bubbles very often form stiff foams in the presence of the other chemicals present in the well fluid, causing significant clean-up problems. Because calcium carbonate is also one of the main binders of sandstones, its dissolution can cause nominally acid insoluble rock to decrepitate into fine particles that are difficult to separate from wash fluids. What is needed are methods and compositions for use with invert emulsion well fluids that effectively remove the drilling fluids without decrepitating the rocks or yielding foam-producing carbon dioxide.

SUMMARY OF THE INVENTION

In one aspect, the present invention relates to a method for cleaning cuttings arising from the use of an invert emulsion well fluid, which comprises contacting the cuttings at least one time with a sufficient amount of a buffered wash.

Other aspects and advantages of the invention will be apparent from the following description and the appended claims.

DETAILED DESCRIPTION

The present invention discloses a novel method for washing cuttings generated by drilling a well using an invert emulsion well fluid. The method involves the use of a buffered acid wash. The present invention relates to the use of a buffered wash containing sufficient acidity to convert all of a surfactant in the invert emulsion from one charge species into another, while preventing the fluid from becoming sufficiently acidic as to dissolve substantial amount of system carbonates. Because the pH at which the emulsion completely reverts from inverted to regular is about 6, a buffered acid wash can be used to cause the reversal of the emulsion without generating carbon dioxide. As used throughout this description, the phrase "sufficient amount of buffered acid wash" is used to denote an amount of buffered acid wash that is sufficient to revert the invert oil emulsion well fluid to a regular (water as the continuous phase) emulsion, thereby enabling reduction of the amount of oil in the cuttings by a measurable amount. It is specifically within the contemplation of the invention that a single washing with the buffered acid wash may be used to reduce the amount of oil in the cuttings, or that multiple washes using the buffered wash may be used to clean the cuttings.

In a first embodiment, a buffered acid wash solution was prepared by adding 168.4 grams of dry citric acid to 0.842 liters of de-ionized water. To this solution, 50 grams of potassium hydroxide was slowly added while vigorously stirring. The pH of the resulting solution was 3.3. Before measuring the pH of the solution, the pH meter was placed in a de-ionized water bath for calibration purposes. Potassium hydroxide was then added to the resulting solution in 20-gram increments, and the resulting pH and temperature of the solution was measured after each increment. Before insertion into the buffer solution, the pH meter read a pH of 6.52 at 27° C. The results of the addition of potassium hydroxide are tablulated below.

TABLE 1

ADDITION OF POTASSIUM HYDROXIDE TO CITRIC ACID SOLUTION

| Total Grams Potassium Hydroxide Added | pH | Temperature (° C.) |
|---|---|---|
| 50 | 3.3 | 33 |
| 70 | 3.9 | 38 |
| 90 | 4.3 | 40 |

TABLE 1-continued

ADDITION OF POTASSIUM HYDROXIDE TO CITRIC ACID SOLUTION

| Total Grams Potassium Hydroxide Added | pH | Temperature (° C.) |
|---|---|---|
| 110 | 4.7 | 45 |
| 130 | 5.2 | 44 |
| 150 | 5.6 | 44 |

Table 1 shows that after 150 grams of potassium hydroxide was added, the solution reached a pH of 5.6. The solution was used to wash small samples of cuttings.

It was unexpectedly found to be important to select a buffered acid wash that promotes a complete reversion of the mud emulsion in the well fluid without causing shale and claystone (the cuttings) to yield. To this end, a survey of pH was done using a variety of buffers, adjusting pH as required, then shaking the buffered wash for 15 seconds with the cuttings. The observed results are tabulated below.

TABLE 2

APPLICABLE PH RANGE

| Buffer solution | Initial pH | Observation |
|---|---|---|
| Blend of 0.25 M $Na_2HPO_4$ and 0.25 M $KH_2PO_4$ ("Buffer A") | 6.9 | Sticky mud on glass, no floating layer. |
| Buffer A adjusted to pH 6.5 | 6.5 | Sticky mud on glass, no floating layer. |
| Buffer A adjusted to pH 6.0 | 6.0 | No sticky mud, floating layer (separated oil) |
| Buffer A adjusted to pH 3.0 | 3.0 | No sticky mud, floating layer (separated oil) Slight foaming |
| Citric acid adjusted to pH 3.0 with caustic (KOH) | 3.0 | Clean looking cuttings, thick floating layer. Some foaming. |
| HCl | 2.0 | Solid mass of cuttings and yielded clay. Thick floating layer. Foaming |

Table 2 illustrates that the applicable pH range for a buffered acid wash according to the present invention is about 2.0 to about 7.0. Further, the above table illustrates that other types of buffered solutions than citric acid may be used.

In a second embodiment, simulated cuttings were prepared by sieving crushed Flat Blue crude clay ore to a particle size range of 0.5 to 0.012 inch. To this ore, a commercially available invert emulsion well fluid, sold under the name FAZEPRO, by M-I of Houston, Tex. was added. The crushed rock was then mixed into the well fluid at a loading of 15 g rock per 350 mL of the well fluid in a glass jar. The jar was then hot-rolled at 150° F. for 1.5 hours, simulating the transit time from an advancing bit in a well bore to the surface. The jar was then removed from the oven and allowed to come to near room temperature. The contents of the jar were then passed over a 50-mesh screen with shaking and tapping of the sieve. This action necessarily leaves a layer of invert emulsion well fluid on the cuttings. These cuttings were found to have 9.9-wt % oil.

An aqueous wash solution was then prepared using 10 w % $KH_2PO_4 \cdot xH_2O$, 1 w % of a strong shale inhibitor, and 0.5 w % of the same invert emulsion well fluid used above. The initial pH was 5.7 and this was adjusted to 4.5 with phosphoric acid. 10 g of the wash solution was added into a capped bottle containing 4.7 g of the simulated cuttings. After adding the wash solution, the capped bottle was shaken for approximately 15 seconds. The wash solution/cuttings mixture was then allowed to stand for 2 minutes to allow for solids settling (this settling time was omitted in later runs as it became apparent the cuttings softened appreciably during the soak).

Next, the wash solution was separated from the cuttings by decanting the supernatant fluid and drawing with a pipette as much liquid as possible from the mass of cuttings. The collected liquids were then centrifuged for 2 minutes at ¾ speed in a Centrifuge International Model HN desktop centrifuge. Any floating layer that was present was drawn off and stored as "oil." Any remaining sediment was returned to the washed cuttings in the capped bottle. "Fresh" wash solution was then added in an amount to reach 10 g of wash solution. This process was repeated for ten cycles, carrying over as much of the wash water as possible.

As the bottles were processed, it became clear that the 2 minutes solids settling time allowed the cuttings to soften. The settling period was eliminated in bottle 5 and following, resulting in cleaner separation and harder cuttings. The results from the above process are tabulated below.

TABLE 1

SUMMARY OF FINDINGS

| Description | Starting Cuttings | Wash Water | Recovered Oil | Washed Cuttings |
|---|---|---|---|---|
| % Oil per Kg of Wet Cuttings | 7.6% | 0.7% | 26.3% | 4.7% |
| % Oil per Kg of Dry Cuttings | 9.9% | 6.3% | 232.1% | 6.6% |

It was determined that the amount of oil had been reduced from 9.9% on a dry basis to 6.6% dry basis. This reduction to less that 6.9% oil is sufficient to allow the discharge of the washed cuttings into the waters of the Gulf of Mexico (that would otherwise be hauled to shore for disposal). Also, significantly, no foaming or gas evolution occurred during the entire process.

As suggested above, a proposed mechanism for how the addition of a buffer to the wash prevents the evolution of carbon dioxide is based on the known reaction of carbonates with low pH fluids to evolve carbon dioxide. Thus, no restriction on the type of buffer is intended by the above embodiments, rather, any suitable buffer solution may be used. It is specifically within the contemplation of the invention that the buffer may be made from organic or inorganic components, and may be applied as an aqueous fluid, dry power, vapor, or non-aqueous fluid to the acid wash.

Further, while the above embodiment describes a buffered solution having a certain pH, it is expressly within the scope of the present invention that pH ranges between 3.0 to 6.5 may be used. More preferably, a pH range of 5.0 to 6.0 may be used. Still more preferably a pH of 5.5 may be used.

The present invention, therefore, advantageously provides a simple, low cost method of cleaning well cuttings created in conjunction with the use of invert emulsion well fluids.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for cleaning earth formation cuttings arising from the use of an invert emulsion well fluid, comprising:

contacting the cuttings with a sufficient amount of a buffered acid wash to revert the emulsion so that water is a continuous phase therein, the buffered acid wash sufficiently buffered to avoid generation of carbon dioxide on contact with the cuttings.

2. The method as defined in claim 1 wherein the buffered acid wash comprises citric acid solution and potassium hydroxide.

3. The method as defined in claim 1 wherein the buffered acid wash has an initial pH of about 3.0 to 6.5.

4. The method as defined in claim 1 wherein the buffered acid wash has an initial pH of about 5.0 to 6.0.

5. The method as defined in claim 1 wherein the buffered acid wash has an initial pH of about 5.5.

6. The method as defined in claim 1 wherein the buffered acid wash comprises at least one of $Na_2HPO_4$ and $KH_2PO_4$.

* * * * *